W. F. FOLMER.
MULTIPLYING CAMERA BACK.
APPLICATION FILED NOV. 23, 1912.

1,061,736.

Patented May 13, 1913.
3 SHEETS—SHEET 1.

Witnesses
Harriet T. Vay
Nelson H. Copp

Inventor
William F. Folmer
By Church & Rich
his Attorneys

W. F. FOLMER.
MULTIPLYING CAMERA BACK.
APPLICATION FILED NOV. 23, 1912.

1,061,736.

Patented May 13, 1913.
3 SHEETS—SHEET 2.

Witnesses

Inventor
William F. Folmer his Attorneys

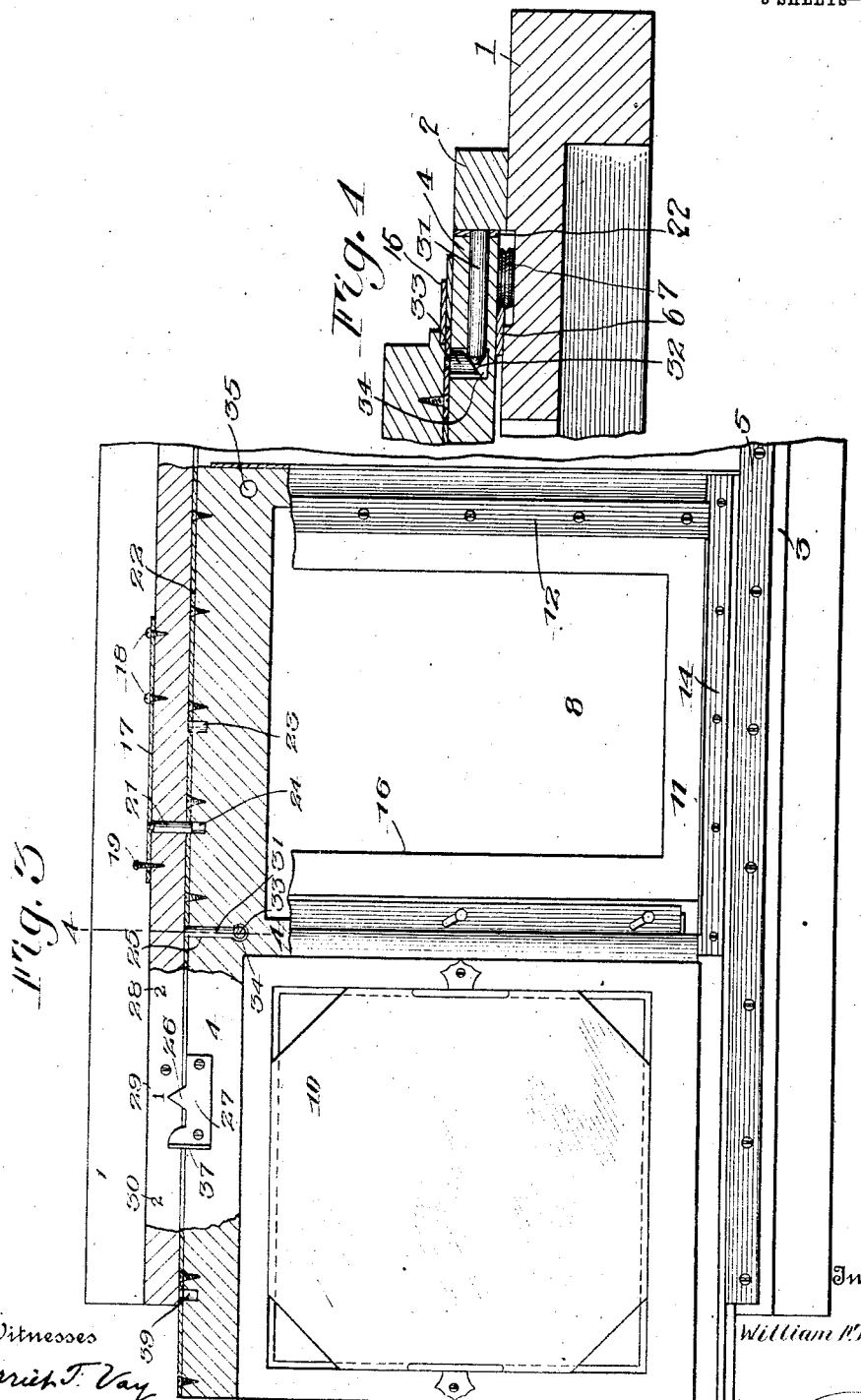

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

MULTIPLYING CAMERA-BACK.

1,061,736.  Specification of Letters Patent.  Patented May 13, 1913.

Application filed November 23, 1912. Serial No. 733,053.

*To all whom it may concern:*

Be it known that I, WILLIAM F. FOLMER, of Rochester, in the county of Monroe and State of New York, have invented certain new and useful Improvements in Multiplying Camera-Backs; and I do hereby declare the following to be a full, clear, and exact description of the same, reference being had to the accompanying drawings, forming a part of this specification, and to the reference-numerals marked thereon.

My present invention relates to photography and more particularly to photographic cameras, and it has for its object to provide a multiplying camera back of simple and efficient construction that will present certain safeguards against improperly positioning the plate with reference to the exposure aperture in the back because of the unsuitable position of the plate in the focal plane.

A further object is to provide a simple and convenient means for halting the carriage and maintaining it accurately in position, the improvements being directed to the interlocking means for the back frame and carriage and toward a suitable control exercised thereover by the medium which carries more directly the sensitized material.

To these and other ends the invention consists in certain improvements and combinations of parts all as will be more fully described, the novel features being pointed out in the claims at the end of the specification.

Figure 1:
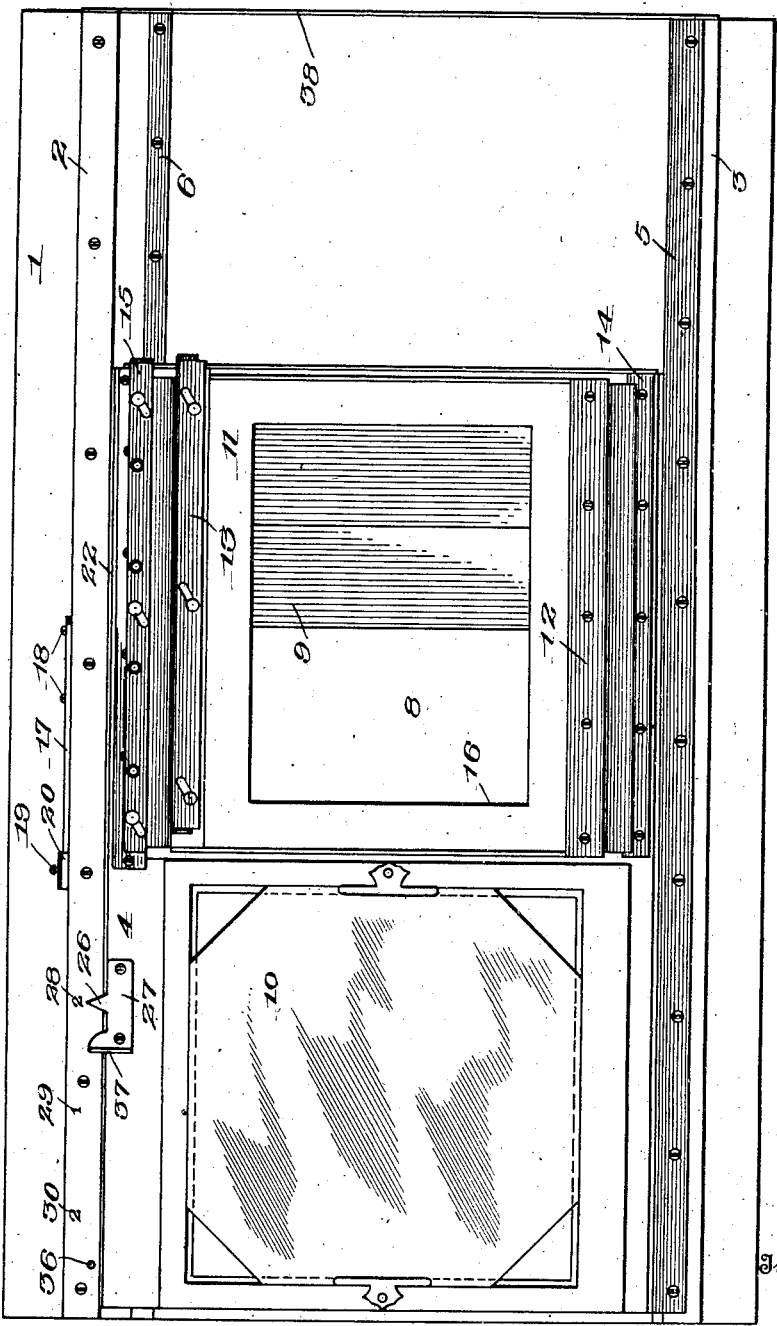
Figure 2:
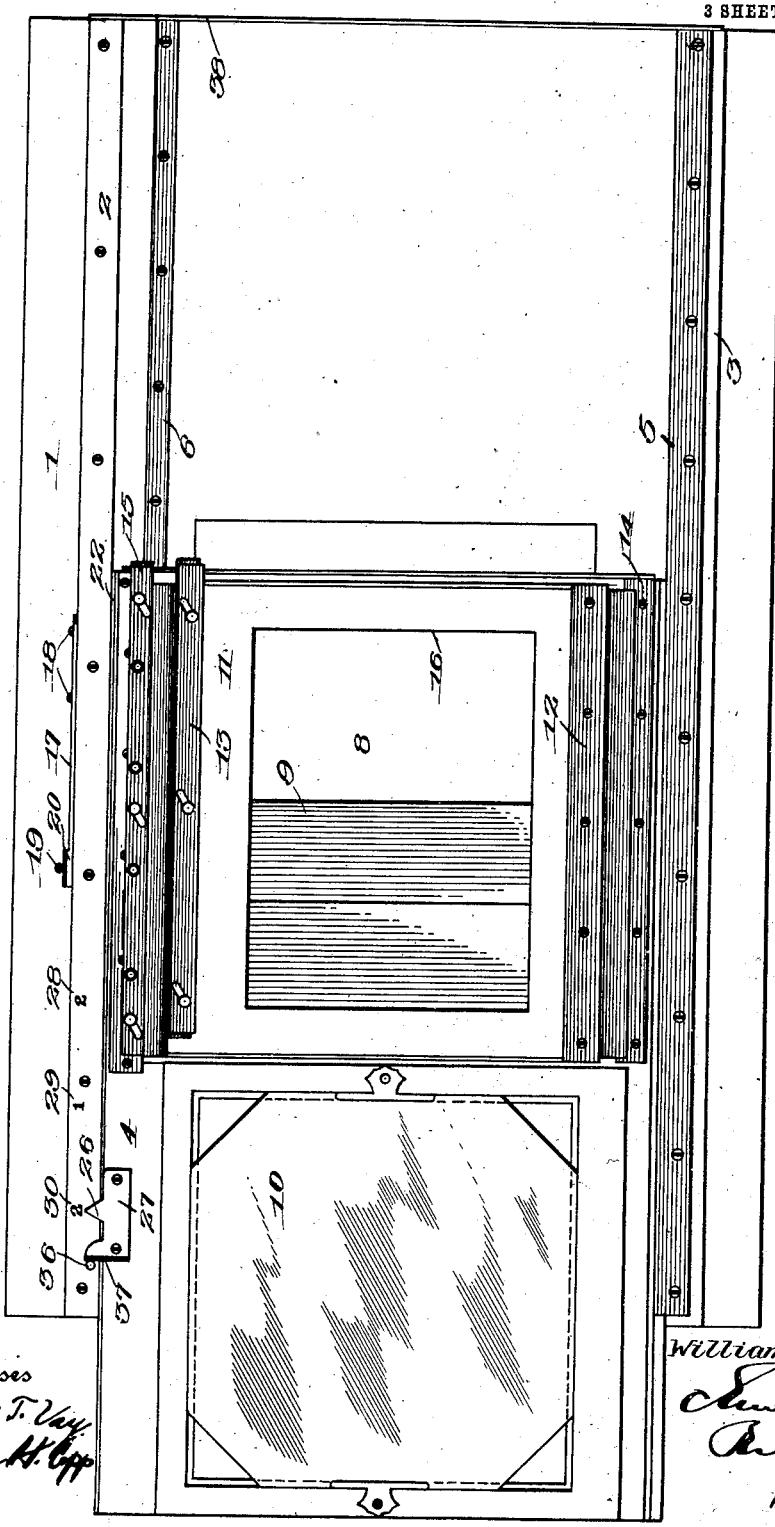

In the drawings: Figure 1 is an elevation of a multiplying back constructed in accordance with and illustrating one embodiment of my invention, showing the plate frame in its initial exposing position for a plurality of exposures along the greater dimension of the plate; Fig. 2 is a similar view with the parts in position to effect a subsequent exposure on the same plate; Fig. 3 is a fragmentary elevation partly in section showing the plate frame reversed for a single exposure with the plate vertically disposed, and also disclosing the interlocking mechanism in greater detail; and Fig. 4 is a fragmentary enlarged section taken substantially on the line 4—4 of Fig. 3.

Similar reference numerals throughout the several figures indicate the same parts.

The device of the present embodiment contemplates the use of the usual back frame or board 1 that is applied at the rear of a camera and may be suitably fitted with attaching devices, to this end. On its rear side it carries a pair of rails 2 and 3 between which slides a shiftable carriage 4 that is retained against the back frame in the present instance, by an overhanging strip 5 on the lower rail 3 and by a track 6 adjacent to the upper rail 2 with which track grooved rollers 7 carried on the forward side of the carriage are arranged to coöperate. The back frame 1 has the usual exposure opening 8 therein, or rather, in a diaphragm 9 applied thereto and removable and replaceable with others of different sizes to vary the size of the exposure opening. When the carriage is moved to the extreme right until halted by the devices hereinafter described, the ground glass or other focusing screen 10 at the left of the carriage is brought into position opposite the exposure opening. After the focus has been adjusted, the carriage is moved to convey the screen to the left of the opening and a plate frame 11 occupying the other half of the carriage is carried into position behind the opening. This plate frame 11 is the part which directly carries the plate holder, adapter or magazine in which the plates are held and is fitted with a fixed keeper 12 and a releasable keeper 13 for this purpose. The frame is preferably square and is itself held on the carriage, by a fixed keeper 14 and a movable keeper 15, in either of two positions, one of which disposes the greater dimension of its exposure opening 16 horizontally, as shown in Figs. 1 and 2, and the other of which disposes this dimension vertically, as shown in Fig. 3.

The interlocking mechanism for halting and retaining the carriage in different predetermined positions on the back frame 1 comprises, in the present instance, a spring latch 17 secured at 18 to the top side of the upper rail 2 on the frame 1 and pierced by a guide pin 19 adjacent to a laterally extending finger portion 20 formed on the spring plate constituting the body of the latch. It carries a bolt portion 21 extending through an aperture in the rail 2, which bolt is preferably loosely connected to the plate so as not to bind. Its end bears against a track 22 on the carriage 11 against which it slides as the respective parts are moved relatively and it has a normal tendency to successively enter a plurality of recesses 23, 24 and 25 provided in the track and carriage and forming stops. When the latch is in coöperation with the various recesses 23, 24 and 25, a pointer 26 on an indicator plate 27, secured to the carriage, coöperates, respectively, with an equal number of index characters 28, 29 and 30. One of the recesses, however, namely the recess 25, is fitted with a plug 31 that fits it rather tightly so as to retain any position to which it is moved and when thrust in one direction it completely closes the recess on the face of the track 22, as shown in Figs. 3 and 4, against the interlocking engagement of the latch bolt 21 so that the latter will ride over the same and initially engage the succeeding recess instead. The plug is moved to this position whenever the plate frame 11 is in the vertical position by virtue of the engagement therewith of a cam face 32 on a pin 33 projecting forwardly from the front face of the said frame, to register with an opening 34 in the carriage that communicates with the recess 25 and into which the end of the plug 31 projects when retracted. With the plate frame in the horizontal position, the pin 33 occupies a blind recess 35 at the other side of the carriage and the plug 31 can be displaced sufficiently by the bolt portion 21 of the latch to effectively engage within the recess 25.

In the operation of the device, assuming that two exposures are to be made side by side, lengthwise of the plate, the holder 11 is arranged in a horizontal position and after focusing is completed, the carriage 4 is moved to the left on the back frame 1 until the latch bolt 21 automatically engages within the first recess 25, displacing the plug 31 if raised. This brings the plate frame 11 to the position of Fig. 1 so that only half of its exposure opening 16 is opposite the exposure opening 8 of the diaphragm 9 in the back frame 1 and only half of the plate, or other sensitized medium, disposed against said opening 16 is exposed. With this adjustment, the pointer 26 indicates the index character 28 showing that the first of two exposures is prepared for. The latch 17 is then lifted so that it will not coöperate with the intermediate recess 24, but allowed to engage with the last recess 23 halting the plate frame 11 in the position of Fig. 2 with the remaining or right hand side of its exposure opening 16 in register with the exposure opening 8 of the diaphragm 9 ready for another exposure and this time the indicator 26 registers with the character 30 on the index. Supposing that it is, thereafter, desired to make a full exposure with the plate in vertical position, the holder frame 11 is reversed to that position and a suitable diaphragm 9 is inserted in the back frame 1. Then, when the carriage is moved to the left after focusing, the latch bolt 21 will ride over the recess 25 because the plug 31 is being held flush with the track 22 by the pin 33 on the holder frame and the said latch bolt will engage with the next succeeding recess, 24, instead, bringing the indicator 26 into initial register with the character 29, indicating a single exposure and bringing the whole plate to a central position in alinement with the enlarged diaphragm opening. Thus, the mistake cannot be made of exposing only a part of the plate when the whole plate should receive the image. Of course, it is obvious that the intermediate recess 24 could be similarly fitted with a plug 31 and the plate frame 11 with another pin 33 to prevent engagement therewith of the latch bolt 21 during a multiple exposure of the plate in horizontal position, so that the latch would not have to be held raised while watching the indicator 26 pass from the character 28 to the character 30 without stopping at the character 29. A stop pin 36 may be provided on the back frame 1 to be engaged by the shoulder 37 on the carriage 4, or preferably, on the indicator plate 27 secured thereto to prevent the carriage from leaving its guides with an extreme movement to the left, in case the latch is disengaged from the last recess 23, but it is not relied on in the present instance, to define the third position of the carriage, as it does not prevent movement of the latter in both directions. Similarly, a stop plate 38 at the right hand end of the back frame prevents the carriage from leaving its guide in that direction, although it is locked additionally by the engagement of the latch bolt 21 with a fourth recess 39 that defines the proper position of the ground glass screen 10 for focusing.

I claim as my invention:

1. In a multiplying back, the combination with a back frame and a shiftable carriage movable thereon, of a reversible plate frame on the carriage and means for interlocking the back frame and carriage controlled by the position of the plate frame with reference to the latter.

2. In a multiplying back, the combination with a back frame, a shiftable carriage movable thereon and a locking device for halting the carriage in a predetermined position, of a reversible plate frame adapted to assume either of two positions on the carriage and tending to render the locking device inoperative when in one of said positions.

3. In a multiplying back, the combination with a back frame, a shiftable carriage movable thereon and means for interlocking the parts comprising an automatic locking device on one part arranged to coöperate successively with a plurality of stops on the other to halt the carriage in different positions relatively to the back frame, of a reversible plate frame adapted to assume either of two positions on the camera and means for preventing the engagement of the latch with one of said stops, said means being rendered operative when the plate frame is in one position and inoperative when it is in the other.

4. In a multiplying back, the combination with a back frame having an automatic latch thereon, a shiftable carriage movable on the back frame and provided with a stop arranged to be normally engaged by the latch to halt the carriage in one position, of a reversible plate frame adapted to assume either of two positions on the carriage and means actuated upon the reversal of the plate frame for rendering the stop ineffective.

5. In a multiplying back, the combination with a back frame having an automatic latch thereon, a shiftable carriage movable on the back frame, and a track on the carriage on which the latch runs, said track being provided with a recess forming a stop with which the latch normally coöperates to lock the carriage in one position relatively to the back frame, of a reversible plate frame on the carriage adapted to assume either of two positions and a member on the carriage held in the recess in the track by the plate frame when the latter is in one position to prevent an effective coöperation of the latch and stop.

6. In a multiplying back, the combination with a back frame having a rail and a shiftable carriage movable on the back frame and having a track disposed against one side of the rail and provided with an aperture forming a stop, of a spring latch mounted on the opposite side of the rail and embodying a bolt extending through the latter to press against the track on the carriage and normally enter the aperture therein when brought into register therewith to lock the carriage in one position, a plug adapted to fill the aperture in the track and prevent the entrance of the bolt, and a reversible plate frame adapted to assume either of two positions on the carriage and to actuate the plug in the aperture when in one of such positions.

WILLIAM F. FOLMER.

Witnesses:
RUSSELL B. GRIFFITH,
H. E. STONEBRAKER.